United States Patent [19]

Brichard et al.

[11] 4,115,519

[45] Sep. 19, 1978

[54] MANUFACTURING PROCESS FOR SODIUM PERBORATE MONOHYDRATE AND PRODUCT OBTAINED ACCORDING TO THE PROCESS

[75] Inventors: Jean Brichard, Vilvoorde; Jean-Claude Colery, Brussels, both of Belgium

[73] Assignee: Interox, Brussels, Belgium

[21] Appl. No.: 737,686

[22] Filed: Nov. 1, 1976

[30] Foreign Application Priority Data

Nov. 6, 1975 [LU] Luxembourg ............................ 73751

[51] Int. Cl.$^2$ ............................................. C01B 15/12
[52] U.S. Cl. ..................................... 423/279; 423/281
[58] Field of Search ....... 423/281, 279, 659, DIG. 16; 23/301, 302

[56] References Cited

U.S. PATENT DOCUMENTS

| | | | |
|---|---|---|---|
| 3,131,995 | 5/1964 | Gonze et al. | 423/281 |
| 3,623,836 | 11/1971 | Denaeyer et al. | 423/281 |
| 3,914,380 | 10/1975 | Dillenburg et al. | 423/279 |
| 3,917,663 | 11/1975 | Kegelnart | 423/415 P |
| 4,002,434 | 1/1977 | Simmersbach et al. | 423/281 |

FOREIGN PATENT DOCUMENTS 911,640  11/1962  United Kingdom .................... 423/281

*Primary Examiner*—G. O. Peters
*Attorney, Agent, or Firm*—Larson, Taylor and Hinds

[57] ABSTRACT

Abrasion resistant granules of sodium perborate monohydrate are made by introducing an aqueous solution containing hydrogen peroxide and an aqueous solution containing sodium metaborate simultaneously into a fluidized bed dryer which contains seeds of a size smaller than that of the desired granules. Water present in the aqueous solutions is evaporated by fluidization gas which is introduced into the fluidized bed dryer. The process products, in one stage, granules of sodium perborate monohydrate having good flavorability, abrasion resistance, and other desirable properties.

12 Claims, 2 Drawing Figures

MANUFACTURING PROCESS FOR SODIUM PERBORATE MONOHYDRATE AND PRODUCT OBTAINED ACCORDING TO THE PROCESS

FIELD OF THE INVENTION

The present invention relates to a process for manufacturing a sodium perborate monohydrate in the form of granules and to the granules thus obtained.

There is a market for sodium perborate monohydrate on the one hand because of its elevated active oxygen content (theoretical value 16.03% corresponding to the formula $NaBO_3 \cdot H_2O$), and on the other hand because it is stable at a higher temperature than sodium perborate tetrahydrate. It is thus used in special washing powders, in solid compositions for bleaching and in different particular cleaning agents.

Up to now, the usual process for manufacturing sodium perborate monohydrate has involved the dehydration of the tetrahydrated product. Various methods of dehydration are noted in the literature, for example fluidized bed processes such as that described in Belgian Pat. No. 718,160 filed July 17, 1968.

These processes have the disadvantage of requiring two successive operations, one leading to the manufacture of sodium perborate tetrahydrate, the other consisting of the dehydration of this product. Moreover, the active oxygen losses are relatively high in view of the accumulation of the losses in the manufacture of sodium perborate tetrahydrate together with those observed during the super-drying of the product. Finally, the product obtained is porous and friable.

A one stage process for manufacturing sodium perborate with an elevated active oxygen content by reaction of a boron source (boric acid, borax or metaborates), sodium hydroxide and hydrogen peroxide in aqueous solution was the object of a U.S. Pat. No. 2,937,998 issued May 24, 1960.

This process has a number of disadvantages. Its technology is complicated. Also, the product obtained is friable and has a very fine granulometric structure, which means that a subsequent agglomeration operation is necessary in order to obtain granules of a size which is compatible with those of the other constituents of washing powders.

The applicant has now found a particularly simple process for manufacturing sodium perborate monohydrate in granular form which does not have the disadvantages mentioned above.

BRIEF SUMMARY OF THE INVENTION

According to the present invention, sodium perborate monohydrate in the form of abrasion proof granules are made in a process in which an aqueous solution containing hydrogen peroxide and an aqueous solution containing sodium metaborate are introduced simultaneously into a fluidized bed dryer containing seeds of a size which is smaller than that of the granules one wishes to obtain, and the excess water present in the aqueous solutions is evaporated by means of fludization gas which is introduced into the fluidized bed dryer.

The process of the present invention is particularly interesting because it enables one to obtain, in one stage, granules of sodium perborate monohydrate which have good flowability, a low abrasion index, an apparent specific weight close to that of other constituents of washing powders and adequate size which is compatible with that of the other constituents of the powders.

The granules thus obtained also have the supplementary advantage of having an active oxygen content which is very close to the theoretical maximum. Finally, the losses in hydrogen peroxide proved to be very low in manufacture, not exceeding 5% in weight.

Detailed Description

Figure 1:
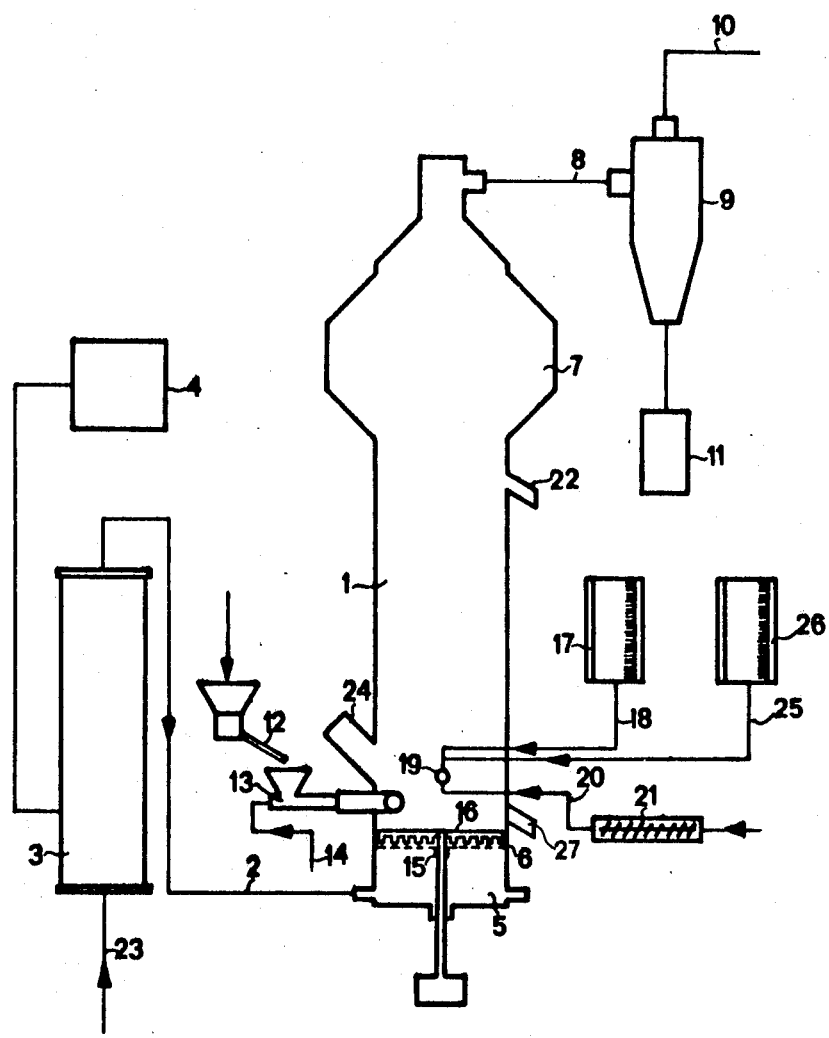

The temperature of the fluid bed does not exceed the temperature at which sodium perborate monohydrate begins to decompose, i.e. about 100° C. It is generally between the ambient temperature and 100° C, usually between 35° and 95° C and preferably between 45° and 85° C,. The temperature of the air or other vector gas introduced at the bottom of the fluidized bed, e.g. through a gauze or a distribution plate, can vary within wide limits, chiefly depending on the temperature one wishes to maintain in the bed, the amount of water to be removed and the flow rate of the vector gas. Most often it is between 110° and 250° C. Other temperatures can, however, be equally suitable.

The aqueous solution containing hydrogen peroxide can contain very variable quantities of this product. It is of advantage to use aqueous solutions containing from 5 to 60% in weight of hydrogen peroxide and preferably from 15 to 40% by weight. It is also of advantage to use aqueous solutions containing from 5 to 75% by weight of hydrogen peroxide and preferably from 15 to 70%. Lower concentrations are of little value in economic terms because the amount of water to be evaporated is then very high. On the other hand, it is not very desirable to use higher concentrations as the solutions are dangerous to handle.

The aqueous solution containing hydrogen peroxide can also, if required, contain certain additives which are particularly able to improve its stability, such as those mentioned in the book by W.C. Schumb et al (*Hydrogen Peroxide*, Reinhold Publ. Corp. New York, 1955). Of these, the stannate and the phosphate of sodium are suitable. These stabilizers are often added although they are not absolutely necessary. These stabilizers are generally used at the rate of 0.001 to 1% by weight based on the weight of 100% hydrogen peroxide.

Other additives can also be added to the solution of hydrogen peroxide, such as, e.g.: perborate stabilizers like those mentioned by W. Machu (*Das Wasserstoffperoxyd und die perverbindungen,* — Hydrogen peroxide and the per compounds — Vienna, 1951, Springer), and more specifically, magnesium sulfate; corrosion inhibitors such as the nitrates; and agents to adjust pH. The perborate stabilizers can be used at the rate of 1 to 50 g of stabilizer per kg of 100% hydrogen peroxide. These additives are not absolutely necessary however.

The aqueous solution containing sodium metaborate can contain very variable quantities of this product within the limits of its solubility, these limits being a function of the temperature of the solution of course. In general, solutions containing from 5 to 40% in weight of sodium metaborate, calculated as $NaBO_2$, are used. Solutions obtained industrially by action of solutions of sodium hydroxide on boron minerals are especially suitable. These solutions usually contain from 10 to 35%, preferably 10 to 25%, by weight of sodium metaborate calculated as $NaBO_2$.

An additive which permits the avoidance of premature crystallization of the perborate in an injector when the two solutions are introduced into the fluid bed by the same injector can also be added either to the solution containing the hydrogen peroxide, or to the solution containing the sodium metaborate, or to both, but this is not absolutely necessary. Several additives can be used for this purpose, such as, e.g. sodium hexametaphosphate.

The molar ratio hydrogen peroxide: sodium metaborate sent to the fluid bed is generally almost equal. Preferably, there is a very slight excess of hydrogen peroxide. Usually, this ratio is between 1 and 1.1 or 1.12 and preferably between 1.001 and 1.05 or 1.10. Higher quantities of hydrogen peroxide are of no use as they cause losses by being carried off by the fluidization gas.

The solutions of the reagents are introduced into the fluidized bed at the same time, either separately by means of two separate injectors or by a single injector, the premixture taking place inside or at the entrance to the injector. These solutions are introduced right into the center of the fluidized bed by any well-known method. For example, one can use pneumatic injectors such as atomizers for this purpose.

The temperature of the solutions can vary within quite broad limits. Preferably, the temperature does not exceed that of the fluidized bed so that premature crystallizations in the injectors are avoided when concentrated solutions are being used. Temperatures between the ambient temperature and 70° C, preferably between 25° and 50° C, are generally used. The temperatures of the two solutions do not necessarily have to be the same.

When the fluidized bed is put into operation, seeds, the dimensions of which are smaller than those of the granules of sodium perborate monohydrate which one desires to obtain, are introduced into the bed. Preferably, these seeds are particles of sodium perborate monohydrate. Particles of other inorganic persalts, such as sodium percarbonate, sodium perborate tetrahydrate or perhydrated phosphates, may also be suitable as they also ensure a homogenous distribution of the active oxygen in the granules.

During operation, the presence in the fluid bed of seeds whose dimensions are smaller than that of the granules one wishes to obtain is also absolutely necessary. These seeds are, at least in part, composed of fine sodium perborate monohydrate produced normally in the bed. One can also increase the proportion of seeds by voluntarily introducing some fine sodium perborate monohydrate into the bed or by mechanically destroying, in the middle of the bed itself, a part of the granules already formed, or again by using both these processes at the same time.

The particles of fine sodium perborate monohydrate which can be introduced into the bed may originate from production rejects after grinding outside the fluidized bed of granules of sodium perborate monohydrate produced in the dryer which are too coarse, from recycling of fines carried out of the bed by the fluidization gas, from manufacture by another process, from grinding of sodium perborate monohydrate particles, or from several of these possibilities all at once. It is also possible to fit up the dryer in the fluidized bed with one or more devices such as grinders, agitators or scrapers which mechanically destroy the agglomerates and promote the formation of seeds at the same time. These devices also enable one to prevent the bed from compressing and agglomerating. These devices are, however, hardly ever used in large sized fluid beds because agglomerates do not form in them. In this case, it is generally preferred that recycled or reject fine sodium perborate monohydrate is introduced into the fluid bed when one wants to increase the proportion of seeds in the bed. The technique preferably used to increase the proportion of seeds in the bed consists of recycling the fines carried out of the bed by the fluidization gas.

The feeding of solid product can be done by any known method, e.g. by means of a Venturi system. The solid load generally has an average particle diameter less than 0.4 mm, most often it is between 0.01 and 0.35 mm. It is quite clear that these values are only given by way of example and that particles of different dimensions can be used.

The dimensions of the particles particularly depend on the proportion of seeds present in the bed, the size of the particles being inversely proportional to the seed content. The size of the grains will thus be inversely proportional to the quantity of fine sodium perborate monohydrate introduced voluntarily into the bed and to the degree of utilization of the mechanical grain destruction devices (grinders, etc.), which may be situated in the bed.

The dimensions of the particles also depend on the pressure of the gas in the injector by means of which the solutions are introduced into the bed, the size of the grains being inversely proportional to the pressure.

It is thus relatively easy to regulate the dimensions of the granules to the value desired by varying the proportion of seeds in the bed either by introducing seeds or by internal destruction of the granules or by varying the pressure in the injectors or again by using these two methods at the same time.

The process according to the invention can be carried out either continuously or discontinuously. The fluidized bed dryer can be or cylindrical shape, of cylindrico-conical shape, in the shape of a parallelepiped or any other shape which allows one to carry out the process.

The granules can be brought out of the apparatus by any known device, e.g. by elutriation via the bottom of the dryer, or via a small lateral tube fitted at the base of the dryer, or by flowing out via a small lateral tube above the base of the dryer, this tube thus determining the height of the fluidized bed.

The gases emitted from the fluid bed pass through a fines separator such as e.g. a cyclone. The gases extracted can either be sent into the atmosphere or recycled to the fluid bed, either in part or in total, after the water vapor they contain has been removed by drying or condensation.

Figure 2:
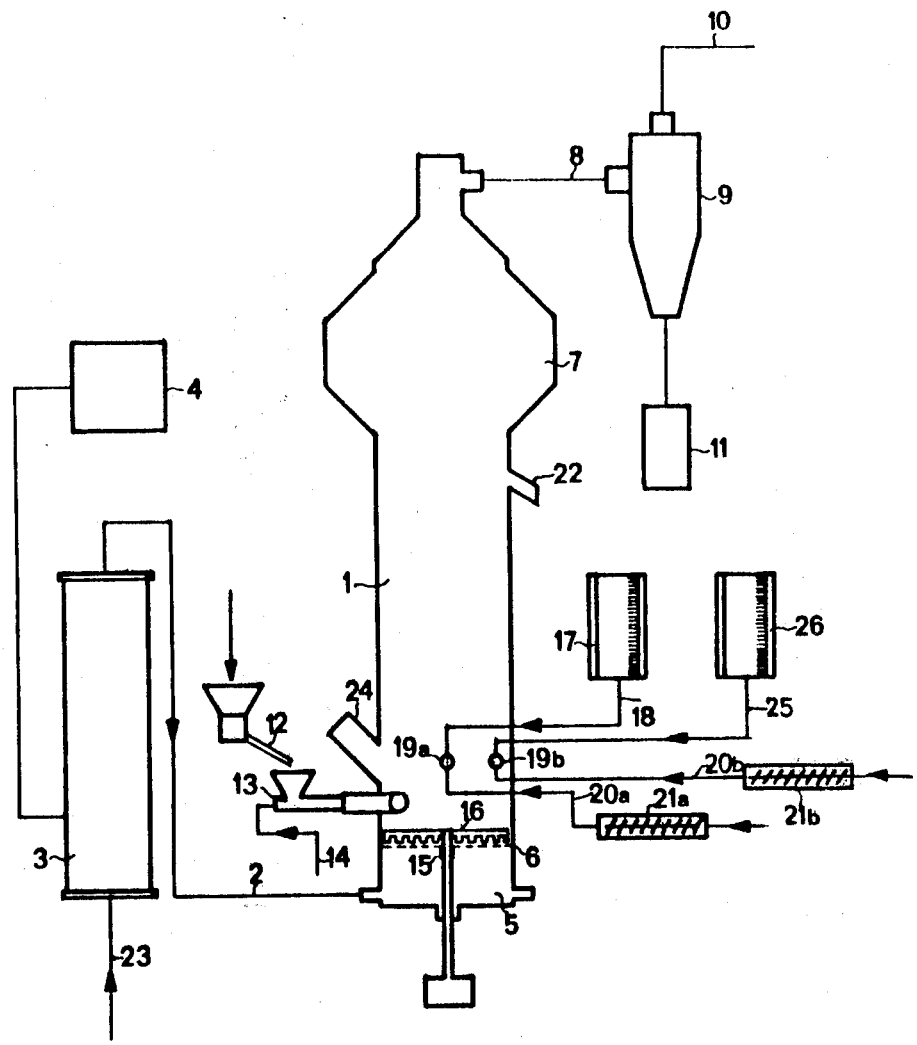

The process according to the invention can be carried out in apparatus such as those shown in FIGS. 1 and 2 of the appendix, for example, which show ways of carrying out the process according to the invention.

FIG. 1 shows a particles bed 1 fluidized by means of a gas such as air which enters the system by means of conduit 2 after having been preheated in a preheater 3 fed with air by conduit 23, the temperature of which is regulated by means of a regulator 4. The hot air passes into the wind box 5, through the grid 6 and reaches the fluid bed 1, which has an area 7 above which fines pass with the gas to a cyclone or collector for return of a proportion of the fines to the fluid bed. The grid 6 is pierced in the center by a hole 15 through which the shaft of a fixed blase scraper 16 can pass. A tube 24 allows a grinder (not shown) to be introduced into the base of the bed.

The gases emitted from the fluid bed pass by conduit 8 into a fines collector or cyclone 9 and leave the apparatus through ventilator line 10. The fines are recovered in vessel 11.

The seeds which are notably made up of all the fines recovered in 11 are sent, via a vibrating channel 12, into the fluid bed with the aid of a Venturi 13 fed with compressed air through conduit 14.

The solution containing hydrogen peroxide leaves thermostatic storage tank 17 through conduit 18. Storage tank 18 is maintained at the required temperature. The sodium metaborate leaves thermostatic storage tank 26 through conduit 25 and tank 26 is also maintained at the required temperature. The two temperatures can be the same or different. The two solutions are mixed and atomized in the fluid bed with the aid of an atomizer 19, fed with compressed air by way of route 20, the air being reheated in 21.

The granulated product is collected either by flowing out through conduit 22 or by elutriation through conduit 27.

FIG. 2 shows an apparatus similar to that shown in FIG. 1 in which the single atomizer is replaced by two atomizers and in which there is no provision for removal by elutriation via the base of the reactor.

The solution containing hydrogen peroxide leaves the thermostatic storage tank 17, maintained at the desired temperature through conduit 18 and is atomized in the fluid bed with the aid of an atomizer 19a, fed with compressed air through conduit 20a, the air being reheated in reheater 21a.

The solution containing sodium metaborate leaves the thermostatic storage tank 26, maintained at the desired temperature through conduit 25, and is atomized in the fluid bed with the aid of an atomizer 19b, which is fed with compressed air through conduit 20b, the air being reheated in reheater 21b.

The other characteristics of this apparatus are the same as those of the apparatus shown in FIG. 1.

A further object of the present invention concerns the granules containing sodium perborate monohydrate which are obtained in the process according to the invention. These granules are characterized by an apparent specific gravity, when free flowing, of between 0.40 and 0.70 or 1.0 kg/dm$^3$ and preferably between 0.45 and 0.65 or 0.95 kg/dm$^3$, a flowability expressed in terms of the time taken for a 250 g quantity of the granules to flow through the 16 mm diameter mouth of a short stemmed analysis funnel not exceeding 10 seconds, and by an abrasion index not exceeding 10%.

The dimensions of the granules can vary within quite broad limits. Preferably, however, granules will be prepared whose granulometry is close to that of the other components of detergent powders. In general, a granulometry such that at least about 80% of the granules have a diameter between 0.1 and 1.5 mm is particularly suitable. An advantageous average diameter for the particles will be between 0.3 and 0.7 mm. Nonetheless, by modifying the conditions of the granule preparation method as disclosed above, one can prepare larger or smaller granules while still maintaining the characteristics of the product as regards flowability, apparent and specific gravity, and abrasion index.

The product which forms the object of the present invention is particularly interesting compared with products obtained in the past because it combines a better abrasion index, better flowability, and a very low fines content. Moreover, the product does not agglomerate.

The abrasion index referred to in the present invention is determined by the method described in the standard ISO/TC 47/WG 11 (secretariat-86) 167 of the British Standards Institution.

The apparent specific gravity when free flowing referred to in the present invention is determined by a process similar to that described in ASTM standards D 392-38 and B 212-48, recommended respectively for measuring the apparent specific gravity of grindable powders and metallic powders. The apparatus used is slightly different however. It consists of a truncated cone-shaped funnel the large base of which has a diameter of 53 mm and the small base, which is fitted with a stopper which can open completely, has a diameter of 21 mm, the height between the bases being 58 mm and the effective volume about 60 cm$^3$.

The cylindrical bucket, volume 50 cm$^3$, has an inside diameter of 37 mm and is about 46 mm high. The base of the funnel is placed 65 mm above the bottom of the bucket. The method is the same as that described in the ASTM standards. The stopper on the funnel is closed and this latter is filled with the product which is to be examined, and the upper rim of the funnel is levelled off by means of a rectilinear blade. The bucket is placed centrally below the funnel and the stopper is opened. After the material has flowed out, the upper level of the bucket is levelled off. The apparant specific gravity when free flowing is equal to the quotient of the weight of the material in the bucket expressed in kg and the volume of the bucket expressed in dm$^3$.

The flowability of the product is characterized by the time taken for a particular quantity of product to pass through the orifice of the stem of a calibrated funnel. The method is somewhat similar to that described in ASTM standard D 392-38.

The apparatus is made up of a funnel with a polished stainless steel clack valve, the anglfe of whose cone is 60°. The interior diameter is 180 mm and the length of the stem 165 mm. The inside diameter of the stem is 16 mm. The test consists of introducing 250 g of this product into the funnel and of measuring the flowing time after the clack valve has been opened.

The resistance to agglomeration of sodium perborate monohydrate is measured by the following agglomeration test. A 250 cm$^3$ glass vessel, fitted with a screw top, is two thirds filled with sodium perborate monohydrate and placed in an oven at 55° C for 24 hours.

Agglomeration of the product, which is evaluated according to the following assessment scale, is then observed:

10: the product flows freely like dry sand
9: the product flows easily with some breaks
8 to 5: partial agglomeration
4 to 1: total agglomeration.

In order to illustrate the invention without, however, limiting its scope, there follow some examples of ways of carrying out the process. The apparatus and working methods described below can also be replaced by equivalents which will be well-known to the expert in this field.

EXAMPLES 1 TO 5

The tests reproduced below were carried out continuously in an apparatus of the same kind as those shown in FIGS. 1 and 2. The cylindrical section dryer used consists of two sections of different diameters. The lower section has a diameter of 152 mm and its height above the air distribution grid 6 is 915 mm, whereas the upper section 7 has a diameter of 305 mm and a height of 300 mm. The gas distribution plate 6 is made up of a sheet of stainless steel perforated with holes of 0.5 mm diameter. This sheet is pierced in the center by a hole of 20 mm diameter so that a fixed blade scraper 16 can pass through (tests 1 to 3 and test 5), or else the product can be removed by elutriation if required (test 4). The scraper revolves at a speed of 50 revolutions per minute. The granules are removed either by elutriation at the base of the bed (test 4) or by a lateral tube situated at the foot of the bed 110 mm above the gas distribution grid (test 5) or by flowing out via tube 22, situated 400 mm (test 1 and 2) or 650 mm (test 3) from the distribution grid.

The bed of particles is fluidized by the introduction of a current of heated air through the gas distribution plate. Initially, the dryer contains sodium perborate monohydrate obtained by dehydration of sodium perborate tetrahydrate. The average diameter of this load is 0.32 mm.

The dryer is continuously fed with an aqueous solution of hydrogen peroxide and an aqueous solution of sodium metaborate by means of one or two atomizers which dip into the center of the fluid bed. In addition to magnesium sulfate, the aqueous solution of hydrogen peroxide also contains about 5 to 100 ppm sodium stannate and comparable quantities of sodium phosphate. The usual operating conditions are shown in Table 1 below. The granulometry is regulated by the introduction into the reactor of fines coming from the cyclone, from the grinding of 1 mm sieve rejects of production and from production fines which passed through a 0.125 mm sieve.

out by super-drying sodium perborate tetrahydrate in a fluid bed.

The fluid bed dryer has a cylindrical section of 150 mm diameter and a height of 1500 mm. The granules are removed by flowing out and the exit is situated 320 mm above the gas distribution plate which is made up of a glass fibre cloth.

The bed of particles is fluidised by introducing a current of heated air through the gas distribution plate. It is fed continuously by sodium perborate tetrahydrate with a diameter of 0.265 mm and an active oxygen content of 10.17% in weight.

The usual operating conditions are shown in Table II below. The characteristics of the products obtained are shown in Table III.

TABLE II

|  |  | Test 6R | Test 7R |
|---|---|---|---|
| Fluidisation Air |  |  |  |
| - temperature | ° C | 140 | 200 |
| - flow rate | N m$^3$/h | 11.6 | 16.4 |
| Temperature of fluidised bed | ° C | 56 | 62 |
| Feed in sodium perborate tetrahydrate | kg/h | 1.13 | 2.76 |
| Production | kg/h.m$^2$ bed | 38.1 | 93.7 |
| Yield from super drying sodium perborate monohydrate | % | 88.9 | 89.3 |

A comparison of examples 1–5 and exampls 6R and 7R shows that the process according to the invention allows one to obtain a higher yield in sodium perborate monohydrate.

Examination of Products

The different products obtained in examples 1 to 5

|  |  | Test 1 | Test 2 | Test 3* | Test 4* | Test 5* |
|---|---|---|---|---|---|---|
| Fluidisation Air |  |  |  |  |  |  |
| -temperature | ° C | 135–140 | 210 | 205 | 175 | 170 |
| -flow rate | N m$^3$/h | 68 | 29 | 31 | 52 | 55 |
| Temperature of the fluidised bed | ° C | 68–71 | 75 | 75 | 73 | 77 |
| Number of atomisers |  | 1 | 2 | 1 | 1 | 1 |
| Initial bed loading | kg | 2.5 | 2.5 | 5 | 5 | 5 |
| Atomiser feed |  |  |  |  |  |  |
| Air |  |  |  |  |  |  |
| -flow rate | N m$^3$/h | 2.5 | 2.1 | 2.65 | 2.35 | 2.2 |
| -temperature | ° C | 28 | 25 | 49 | 50 | 90 |
| -pressure | kg e/cm$^2$ | 1.5 | 1.25 | 1.6 | 1,5 | 1,3 |
| Solution of H$_2$O$_2$ |  |  |  |  |  |  |
| -flow rate | kg/h | 0.57 | 0.54 | 0.56 | 0,54 | 0,55 |
| -temperature | ° C | 25 | 25 | 25 | 25 | 25 |
| -concentration of H$_2$O$_2$ | % wt. | 25 | 27.2 | 26 | 26 | 26 |
| ""of MgSO$_4$. 7H$_2$O | % wt. | 0.75 | 0.81 | 0.78 | 0.78 | 0.78 |
| Solution of sodium metaborate |  |  |  |  |  |  |
| -flow rate | kg/h | 1.33 | 1.3 | 1.26 | 1.27 | 1.3 |
| -temperature | ° C | 25 | 25 | 45 | 40 | 45 |
| -concentration of NaBO$_2$ | % wt. | 20.1 | 20.9 | 20.9 | 20.9 | 20.2 |
| ""of Na$_6$(PO$_3$)$_6$. 10H$_2$O | % wt. | 0 | 0,27 | 0 | 0.27 | 0 |
| Molar ratio at introduction |  |  |  |  |  |  |
| H$_2$O$_2$/NaBO$_2$ |  | 1.03 | 1,05 | 1.07 | 1.02 | 1,05 |
| Recycling of fines |  | nothing |  |  |  |  |
| Air flow to the Venturi | N m$^3$/h | — | 1.6 | 0.75 | 1.6 | 1.6 |
| Air pressure to the Venturi | kg e/cm$^2$ | — | 1.3 | 0.55 | 1.3 | 1.3 |
| Production | kg/h.m$^2$ of bed | 23 | 23 | 23 | 23 | 23 |
| Sodium perborate monohydrate yield ** | % | 100 | 95 | 96 | 98 | 100 |

*In these tests a grinder was introduced via tube 24, which runs 4 secs every 60 secs approx.
**The yield is calculated with relation to total NaBO$_2$ and taking account of the stabilisers present in the finished product.

The characteristics of the products obtained are shown in Table III.

Comparative Examples 6R and 7R

By way of comparison, two continuous sodium perborate monohydrate manufacturing tests were carried were compared with those obtained in examples 6R and 7 R and also with a commercial quality of sodium perborate monohydrate.

During the tests described in examples 2 and 5, several samplings were made during the course of a test.

The samplings are identified in Table III as "B" and "C" in test 2 and as "F" through "K" in test 5. These different samplings are obtained by modifying the amounts of recycled fines.

The abrasion index referred to in the present invention was measured according to the test described in the standard ISO/TC 47/WC 11 (secretariat - 86) 167 of the British Standards Institution. As this test is particularly strict, by way of comparison another less strict test, which was frequently used before the ISO test was perfected, was carried out. This test is referred to herein as "applicant's test" to distinguish it from the "ISO" test mentioned above. This test is as follows:

Two sieves are used, sieve B and sieve A.. Sieve B has the larger mesh aperture and is the commercially available sieve having a mesh aperture next smaller than the average diameter of the particles. Sieve A has a mesh aperture which is one fourth that of sieve B. Exactly 50 g of the fraction of the sample which was rejected at the base sieve B, the mesh aperture of which is the next stage down from the average diameter of the product, are weighed out. This sample is introduced into a rotating drum together with 200 g of lead balls of 6 mm diameter. This drum is rotated at 140 rpm for 15 minutes and then its contents are transferred without loss into a sieve of 4 mm mesh aperture which is superimposed on a sieve A (the mesh aperture of this sieve being 4 times less than that of sieve B), which is itself placed on a collecting tank. 30 seconds sieving is done to separate the lead balls from the sodium perborate monohydrate. Then the sieve A and the collecting tank are placed onto a RO-TAP mechanical sieving device and sieving is done mechanically for 15 minutes. The abrasion index in % is given by the weight of material collected in the collecting tank multiplied by 2.

The active oxygen content, the apparent specific gravity when flowing, the average diameter, the flowability, the abrasion, and agglomeration index were measured for each of the samples and are presented in Table III below.

An examination of Table III reveals that the product obtained by the process of the present invention can attain an oxygen content which is close to the theoretical content (see tests 1 and 5). Moreover, the abrasion index is much lower than that observed for products obtained accoding to other processes. Finally, because the process is flexible, the granulometry of the product can be varied according to particular needs, which is not the case in processes by superdrying, in which the granulometry of the product is a function of that of the sodium perborate tetrahydrate with which one started. One can thus obtain a product which can be incorporated directly into washing powders.

300 mm length and 900 mm height. The granules are removed by flowing out via a tube above the base of the dryer, situated 600 mm from the distribution of the grid.

The bed of particles is fluidized by the introduction of 80 Nm$^3$/h of a current of air heated at a temperature of 160° C through the gas distribution plate. The temperature of the fluidized bed is 74° C.

The dryer is continuously fed with an aqueous solution containing 50% by weight of hydrogen peroxide and 1.6% by weight of $MgSO_4 \cdot 7H_2O$, and an aqueous solution containing 30% by weight of $NaBO_2$ by means of one atomizer which dips into the center of the fluid bed. The molar ratio $H_2O_2/NaBO_2$ at introduction is equal to 1.07 and the solutions of $H_2O_2$ and $NaBO_2$ are respectively introduced with a flow rate of 0.66 and 2.0 kg/h.

The sodium perborate monohydrate yield is equal to 100 %. The product has an average diameter of 0.360 mm, an active oxygen content of 166 g/kg and an apparent specific gravity of 0.86 kg/dm$^3$.

What is claimed is:

1. A process for the manufacture of sodium perborate monohydrate in the form of abrasion resistant granules, comprising introducing an aqueous solution containing hydroen peroxide and an aqueous solution containing sodium metaborate simultaneously into a fluidized bed dryer which contains seeds of a size which is smaller than that of the granules one wishes to obtain, and evaporating the water present in the said aqueous solutions by inroducing fluidization gas into the fluidized bed dryer.

2. A process according to claim 1, wherein the temperature of the fluid bed is between the ambient temperature of 100 ° C.

3. A process according to claim 1, wherein the temperature of the fluid bed is between 35° and 95° C.

4. A process according to claim 1, wherein the temperature of the fluid bed is between 45°and 85° C.

5. A process according to claim 1, wherein the solution containing hydrogen peroxide contains from 5 to 75% by weight of hydrogen peroxide.

6. A process accoding to claim 1, wherein the solution containing hydrogen peroxide contains from 15 to 70% by weight of hydrogen peroxide.

7. A process according to claim 1, wherein the solution containing sodium metaborate contains from 5 to 40% by weight of sodium metaborate.

8. A process according to claim 1, wherein the solution containing sodium metaborate contains from 10 to 35% by weight of sodium metaborate.

9. A process according to claim 1, wherein the molar ratio hydrogen peroxide:sodium metaborate introduced into the fluid bed dryer is between 1 and 1.12.

TABLE III

| Products | | Test 1 A | Test 2 B | C | Test 3 D | Test 4 E | F | Test 5 G | H | I | J | Test 6R K | Test 7R L | M | Commercial Product N |
|---|---|---|---|---|---|---|---|---|---|---|---|---|---|---|---|
| Active O$_2$ | g/kg | 160 | 154 | 154 | 155 | 156 | 156 | 159.8 | 160.4 | 162 | 158 | 159 | 151.1 | 150.7 | 152 |
| Apparent spec. grav. | kg/dm$^3$ | 0.59 | 0.62 | 0.58 | 0.60 | 0.61 | 0.64 | 0.65 | 0.67 | 0.63 | 0.65 | 0.56 | 0.59 | 0.58 | 0.55 |
| Average diameter | mm | 0.97 | 0.475 | 0.610 | 0.650 | 0.640 | 0.675 | 0.630 | 0.635 | 0.720 | 0.730 | 0.690 | 0.255 | 0.245 | 0.320 |
| Flowability | seconds | 8 | 6 | 7 | 7 | 8 | | 7 | | | 7 | 7 | 6 | 6 | |
| Abrasion index :-ISO | % | 4.2 | 8.1 | 6.6 | 5.6 | 6.0 | 5 | 5.3 | 4.5 | 3.3 | 3.2 | 3.5 | | | 15.6 |
| - Applicant's test | % | 2.8 | 2.4 | 1.7 | 1.9 | 2.0 | 2.1 | 1.7 | 1.3 | 1.2 | 1.2 | 1.3 | 12 | 6 | 5.4 |
| Agglomeration index | | | | | 10 | | | 10 | 10 | 10 | 10 | 10 | 10 | | |

EXAMPLE 8

The test reproduced below is carried out in an apparatus of the same kind as the one shown in FIG. 1. The fluid bed has a parallelepipedic shape of 150 mm width, 10. A process according to claim 1, wherein the seeds whose size is smaller than that of the granules one wishes to obtain and which are present in the fluid bed contain sodium perborate monohydrate.

11. A process according to claim 10, wherein the seeds of sodium perborate monohydrate are made up at least partially of fine sodium perborate monohydrate produced in the process.

12. Granules containing sodium perborate monohydrate of an apparent specific gravity when free flowing between 0.40 and 1.00 kg/dm$^3$, of a flowability expressed by the time taken for a quantity of granules weighing 250 g to pass through the 16 mm diameter orifice of a short stemmed analysis funnel not exceeding 10 seconds, and of an abrasion index not exceeding 10%, as determined by the method described in the standard ISO/TC 47/WG11 (secretariat-86) 167 of British Standards Institution.

* * * * *